United States Patent Office 3,324,723
Patented June 13, 1967

3,324,723
INDICATING DEVICES FOR HEAT TREATMENT
Alan Rutherford Ritchie, Billericay, Essex, and Kenneth Holland, Upminster, Essex, England, assignors to Macarthys Limited
Filed Mar. 4, 1965, Ser. No. 437,147
Claims priority, application Great Britain, Mar. 9, 1964, 9,809/64
5 Claims. (Cl. 73—358)

This invention relates to visual indicating devices for heat treatment, particularly to visual indicators for inclusion with articles, for example surgical dressings, which are to be subjected to heat treatment for a period of time, such as in an oven or in a steam autoclave, to indicate the adequate completion of the heating process.

When an autoclave or oven is packed with articles to be heated, particularly when such articles pack closely together, it is difficult to ascertain that all parts of the load are maintained at the required temperature for the necessary length of time to ensure adequate treatment of all articles.

British Patent No. 889,573 describes an indicator, suitable for use as a visual sterilisation indicator, separate indicator being attached to or packed with each article or load to be sterilised. The device described in the complete specification of that patent comprises an envelope having first and second compartments, a wick extending from the first compartment into the second, the first compartment containing a coloured indicator which liquifies at about the critical temperature for sterilisation and flows along the wick, so that maintenance of the critical temperature for the necessary time is indicated by the indicator reaching a marked position along the length of the wick.

A particular embodiment there described was intended to indicate sterilisation conditions at a temperature of 120° C. held for a period of 30 minutes.

The present invention provides an improved visual indicator, of the same general form as that described in British Patent No. 889,573, and one that is, in particular embodiments, suitable for sterilisation conditions at a temperature of 134° C., held for a period of 3 minutes. Other time/temperature relationship may be accommodated by suitable selection of materials.

Accordingly, the present invention provides an indicator for heat treatment comprising a wick or like porous member having attached thereto a bead of coloured or dye-containing indicating substance which is solid at room temperature but melts substantially at a critical temperature to be indicated, within the range of 80° C. to 300° C.

Preferably, the wick is backed by a heat-conducting material. A metal foil is a suitable material for this purpose.

Conveniently, the wick is dipped into the liquid indicating substance so that a drop of the substance adheres to the wick, the drop being quickly dried or cooled to form the bead, before the liquid indicator has time to creep along the wick to any significant extent. Alternatively, a drop or tablet of the material is otherwise positioned on the wick.

In order that the coloured indicating substance does not mark dressings or the like, with which the indicator is used, it is advantageous to enclose the indicator in a transparent or translucent envelope of plastic material or in a glass tube.

As indicating substance, it is preferred to use a 2:4-dinitro phenylhydrazone, the substance being self-coloured and selected to have a melting point appropriate to the conditions to be indicated.

In order that the invention may readily be carried into practical effect, one embodiment will now be described in detail, by way of example, with reference to the accompanying drawings, of which:

The example now to be described, with reference to the accompanying drawings, is intended as a visual sterilisation indicator to indicate that it, and the article with which it is associated, have undergone sterilisation conditions at a temperature of 134° C. lasting for 3 minutes.

Figure 1:
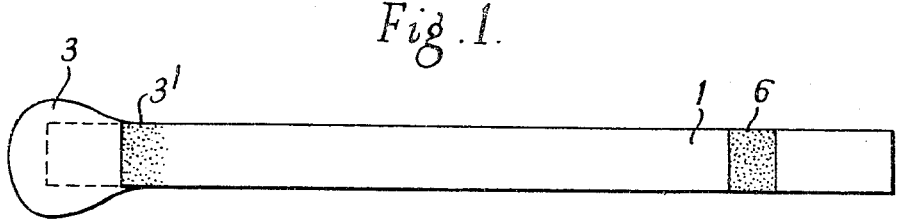
FIGURE 1 is an enlarged diagrammatic plan view of a visual indicating device according to the invention.
Figure 2:
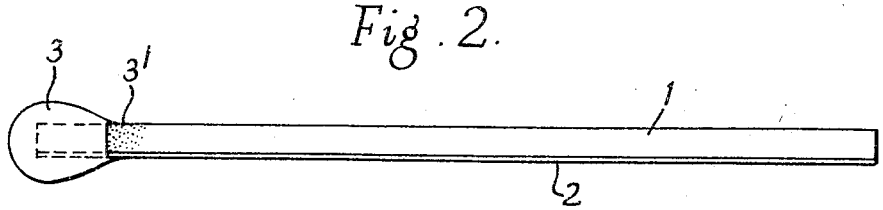
FIGURE 2 is a diagrammatic median cross-section of the indicating device of FIGURE 1, the scale of the thickness of the indicating device being further increased to show the construction thereof

The wick 1, see particularly FIGURES 1 and 2, is of filter paper, backed with thin aluminum foil 2, see FIGURE 2. The wicks are cut from a sheet, of the backed paper, each about 1¾ inch length and about 0.2 inch width. The sheet is previously printed, or otherwise marked, with a transverse line which provides a calibration mark 6 for each wick 1 cut from the sheet.

The dimensions of the wick are of little importance, other than that the length is related to the diffusion rate of the indicating substance chosen and to the period for which the indicated temperature is maintained. The dimensions given above show the conveniently small size of the device, however.

One end of the wick 1 is dipped in a small bath of a molten 2:4-dinitro phenylhydrazone which melts in dry heat at 141–143° C. The increased melting point is necessary because of the effect of steam on the compound. The wick 1 is removed with a drop 3 of the 2:4-dinitro phenylhydrazone attached. The drop 3 is allowed to solidify so that the drop 3 adheres to the wick 1 in similar manner to a match-head. By quickly forming and solidifying the drop 3 of indicating substance, creep of the indicating substance and hence the discolouration of the wick is confined initially to a small portion of the wick represented by the shaded portion 3'.

The wick 1 is then enclosed in a transparent envelope 4 of thermoplastic material, about 2 inches in length and about ¾ inch width, as shown in FIGURE 2.

Figure 3:
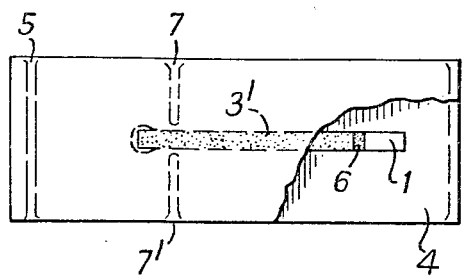
FIGURE 3 is a diagrammatic plan view of the visual indicating device of FIGURE 1 in a transparent plastic envelope showing its appearance after use.

The open end of the thermoplastic envelope 4 is then sealed, as shown at 5 in FIGURE 3.

The bead of indicating substance shows in the unused indicating device, as a discolouration of about ⅛ to ¼ inch of the wick at one end.

When subjected to a temperature of 134° C. in a steam autoclave, the indicating substance melts and diffuses along the wick, the extended length of discolouration showing the length of time the temperature of 134° C. or higher is maintained. After 3 minutes, the indicating substance has diffused about a further ¾ inch along the wick, and has reached the calibration mark 6, as shown in FIGURE 3.

With an indicating device according to the invention, by choice of the melting temperature of the 2:4-dinitro phenylhydrazone, or alternative dye containing substance to be used, and by choice of the wick porosity and length, heat treatment conditions can adequately be indicated within the temperature range of 80° C. to 300° C. and within the time range from 10 seconds to 2 hours approximately. The melting temperature of the indicating substance and the wick length are determined empirically for the required indicating condition and, in relation to the dry heat melting temperature of the indicating substance, it is to be noted that in the example above, using 2:4- dinitro phenylhydrazone, the dry heat melting temperature is 7–9° C. above the steam heat temperature it is required to indicate.

As an alternative to using an envelope, as described above, having three closed sides, the fourth being closed in manufacture, an envelope may be formed from two flat sheets of thermoplastic material, all four sides being closed under compression in a single operation.

In a further alternative, the envelope is divided into two intercommunicating compartments by a partial seal along the length of the wick, near the end of the drop 3 of indicating substance. This partial seal comprises two sealed regions, as shown at 7, 7′ in FIGURE 3, extending from the opposite sides of the envelope 4 towards the wick 1, but not sealing across the wick.

Without this seal, in certain circumstances and if the drop 3 of indicating substance is in excess of requirement for creeping along the wick, the substance may spread inside the envelope.

What we claim is:

1. An indicating device for visually indicating a heat treatment, said device comprising a wick of pre-determined length, said wick including a heat-conducting layer and having a solidified drop of a fusible colored indicating material attached to and eveloping one end thereof, said material impregnating said one end of said wick only at said one end, said indicating material being solid at room temperature and having a melting point of between 80° C. and 300° C.

2. An indicating device according to claim 1 wherein said heat conducting layer comprises aluminum.

3. An indicating device according to claim 1 including a transparent envelope enclosing said wick.

4. An indicating device according to claim 1 wherein said indicating material is a 2:4-dinitro phenylhydrazone.

5. An indicating device according to claim 1 wherein said wick includes a reference mark spaced from said drop.

References Cited

UNITED STATES PATENTS

| 2,850,393 | 9/1958 | Romito. | |
|---|---|---|---|
| 3,002,385 | 10/1961 | Wahl et al. | 73—358 |
| 3,055,759 | 9/1962 | Busby et al. | 73—356 |

FOREIGN PATENTS 889,573  2/1962  Great Britain.

LOUIS R. PRINCE, *Primary Examiner.*

N. B. SIEGEL, *Assistant Examiner.*